United States Patent
Moriya

(10) Patent No.: US 8,275,872 B2
(45) Date of Patent: Sep. 25, 2012

(54) NETWORK SYSTEM USING WSD PROTOCOL, COMPRISING PLURALITY OF DEVICES CAPABLE OF CHANGEOVER BETWEEN REPRESENTATIVE DEVICE AND NON-REPRESENTATIVE DEVICE, AND MANAGEMENT METHOD THEREFOR

(75) Inventor: Takashi Moriya, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 81 days.

(21) Appl. No.: 12/773,397

(22) Filed: May 4, 2010

(65) Prior Publication Data
US 2010/0287269 A1 Nov. 11, 2010

(30) Foreign Application Priority Data

May 7, 2009 (JP) ................................ 2009-112978
Apr. 22, 2010 (JP) ................................ 2010-098686

(51) Int. Cl.
*G06F 15/16* (2006.01)
*H04L 12/28* (2006.01)
(52) U.S. Cl. .................... 709/223; 709/203; 370/351
(58) Field of Classification Search .................. None
See application file for complete search history.

(56) References Cited

U.S. PATENT DOCUMENTS

| 7,673,008 | B2 * | 3/2010 | Kojima | 709/208 |
| 7,940,744 | B2 * | 5/2011 | Lehotsky et al. | 370/351 |
| 2004/0006622 | A1 * | 1/2004 | Burkes et al. | 709/225 |
| 2006/0053216 | A1 * | 3/2006 | Deokar et al. | 709/223 |
| 2006/0190521 | A1 * | 8/2006 | Kojima | 709/200 |
| 2006/0190553 | A1 * | 8/2006 | Kojima | 709/216 |
| 2008/0140787 | A1 * | 6/2008 | Shima | 709/206 |
| 2010/0036905 | A1 * | 2/2010 | Shima | 709/203 |
| 2011/0102614 | A1 * | 5/2011 | Juen | 348/220.1 |
| 2011/0188378 | A1 * | 8/2011 | Collins et al. | 370/236 |

FOREIGN PATENT DOCUMENTS

| JP | 2003-186765 A | 7/2003 |
| JP | 2004-355446 A | 12/2004 |

\* cited by examiner

*Primary Examiner* — Peling Shaw
*Assistant Examiner* — Joiya M Cloud
(74) *Attorney, Agent, or Firm* — Canon USA, Inc., IP Division

(57) ABSTRACT

The network system includes: a command transmitting unit that transmits a command for requesting information required by the representative device for network management from the non-representative device, when the non-representative device has joined a network or when there is a change in a state of the non-representative device; a command receiving unit that receives a command including the information sent from the non-representative device that has received the command; a management unit that manages the information received by the command receiving unit as device management information; a representative device selecting unit that selects a next representative device using the device management information when functions of the representative device are to be disabled. The network system does not need a special management apparatus when there is a changeover between a representative device and a non-representative device and management authority as the representative device as well as accumulated information are inherited.

2 Claims, 12 Drawing Sheets

NETWORK SYSTEM USING WSD PROTOCOL, COMPRISING PLURALITY OF DEVICES CAPABLE OF CHANGEOVER BETWEEN REPRESENTATIVE DEVICE AND NON-REPRESENTATIVE DEVICE, AND MANAGEMENT METHOD THEREFOR

BACKGROUND OF THE INVENTION

1. Field of the Invention

The present invention relates to a network system and method therefor that is capable of managing information maintained in multiple devices present on a network without involving a special management application and/or server and without imposing load on the network.

2. Description of the Related Art

In recent years, network supporting apparatus increase which include printers and home electronics. So, communication protocols for use between devices on a network, mechanisms for device discovery and installation, and specifications of printing services have been standardized.

Standard communication protocols for client PCs to utilize networking apparatuses more generically and/or services for facilitating use of devices have been standardized, e.g., Web Service for Devices (WSD), Universal Plug&Play (UPnP) (registered trademark), and Bonjour (Rendezvous) (registered trademark).

The WSD is a standard specification defined for accommodating demands for various services using devices. Basically, the WSD uses a Web service architecture, providing standardized communication protocols and a printing service.

Such a network system exists that includes a representative device to collect information on devices on a network, non-representative devices that are under management of the representative device, and a management apparatus to manage the network system based on device information collected by the representative device.

Japanese Patent Application Laid-Open No. 2003-186765 proposes a method for reducing load on a management apparatus and a network in such a network system by having the representative device collect device information which is broadcast by non-representative devices when the devices join the network system and transmit all collected information to the management apparatus.

In information managed by the representative apparatus, there may be past information that cannot be re-collected once lost, but that can be useful, such as individual users' printing history, performance log for network communication, and/or operational status of apparatuses, for example.

The conventional technique mentioned above, however, allows the representative device to maintain only information obtained when a non-representative device joins the network. Therefore, when a changeover between the representative device and a non-representative takes place on the network, past information on the non-representative apparatus cannot be inherited.

On the other hand, a method is possible that has the representative device collect information on a non-representative device after the non-representative device joins the network, by polling. This method, however, has a problem of heavy load being placed on the network because communication traffic is produced at all times.

SUMMARY OF THE INVENTION

The present invention enables changeover between the representative device and a non-representative device without involving a special management apparatus and without imposing load on a network. The present invention further has an object of providing a network system in which management authority as the representative device as well as management information for non-representative devices accumulated so far can be inherited to a non-representative device. The representative device has the following configuration.

The representative device includes: a command transmitting unit that transmits a command for requesting information required by the representative device from the non-representative device at a predetermined timing; a command receiving unit that receives a command including the information sent from the non-representative device that has received the command; a management unit that manages the information received by the command receiving unit as device management information; a representative device selecting unit that selects a next representative device using the device management information when functions as the representative device are to be disabled; an inheritance information generating unit that generates inheritance information for delegating authority as the representative device and inheriting the device management information; and an authority-inheriting command transmitting unit that sends the inheritance information to the next representative device.

Further features of the present invention will become apparent from the following description of exemplary embodiments with reference to the attached drawings.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
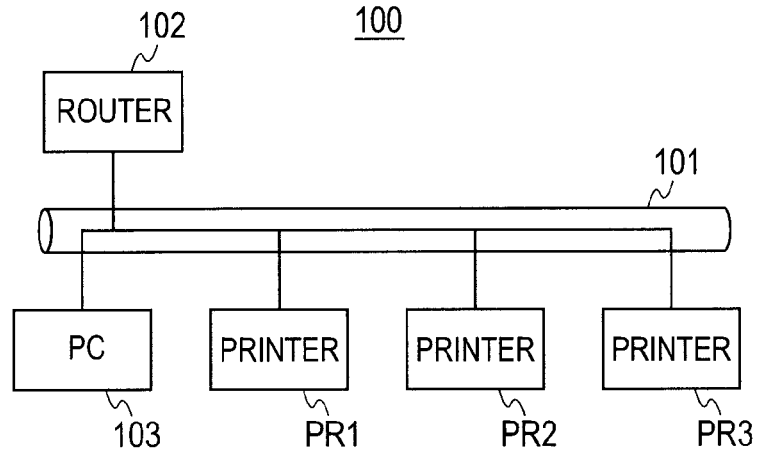
FIG. 1 illustrates a network printing system 100 as a first embodiment of the present invention.

FIG. 1 illustrates a network printing system 100 as a first embodiment of the present invention.

The network printing system 100 is a system for network printers based on the WSD protocol, an embodiment that utilizes the WSD protocol to determine a representative device (hereinafter, referred to as a representative printer) and a non-representative device (hereinafter, a non-representative printer) as well as changeover from the representative printer to a non-representative printer.

A LAN 101 is a local area network, to which a router 102, a PC 103, a printer PR1, a printer PR2, and a printer PR3 are connected and they exchange data with each other via the network.

In the network printing system 100, one of the printers autonomously becomes the representative printer in a manner described below to manage information such as operational status and performance of all non-representative printers connected to the network.

When a user wants to view management information of the representative printer, the user can access a Web server for the representative printer from a web browser included in the PC 103 and view or manipulate the information using Hyper Text Markup Language (HTML).

Figure 2:
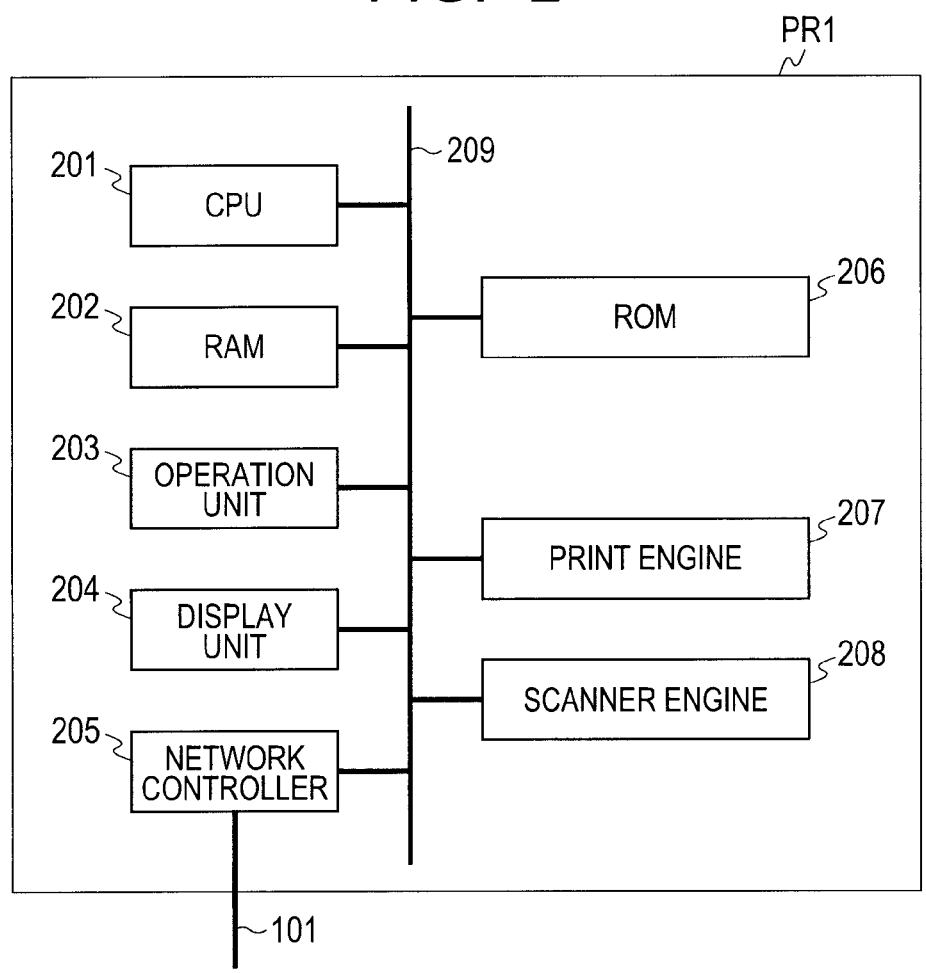
FIG. 2 illustrates an internal configuration of a printer PR1.

FIG. 2 illustrates an internal configuration of the printer PR1. A CPU 201 controls the entire apparatus with reference to a ROM 206 in which programs for basic control and the like are written. A RAM 202 is used as a work area for executing a program read from the ROM 206, as a buffer for use at data transmission/reception, and as a temporary buffer for image data generated in a scanner engine 208.

A client PC sends and receives commands for performing printing/scanning to and from a network controller 205 via the wired LAN 101, which is connected according to Ethernet (registered trademark) defined by IEEE802.3. Also, image data is sent from the scanner to the client PC.

The network controller 205 includes a connector for an Ethernet (registered trademark) cable for supporting wired LAN communication, and a controller responsible for interface control. Communication is performed by connecting an Ethernet (registered trademark) cable to the connector. A wireless LAN network defined by IEEE 802.11a/b/g may also be used by adding a wireless LAN PC card and a wireless controller.

When the network controller 205 supports a wireless LAN, it includes a PC card interface for connecting a PC card for supporting wireless LAN communication. The first embodiment provides a printing/scanner that supports the WSD which is a printing/scanning service as a communication protocol. A communication protocol system used in the WS, and request and response forms relating to printing/scanning are defined as standards.

Figure 3:
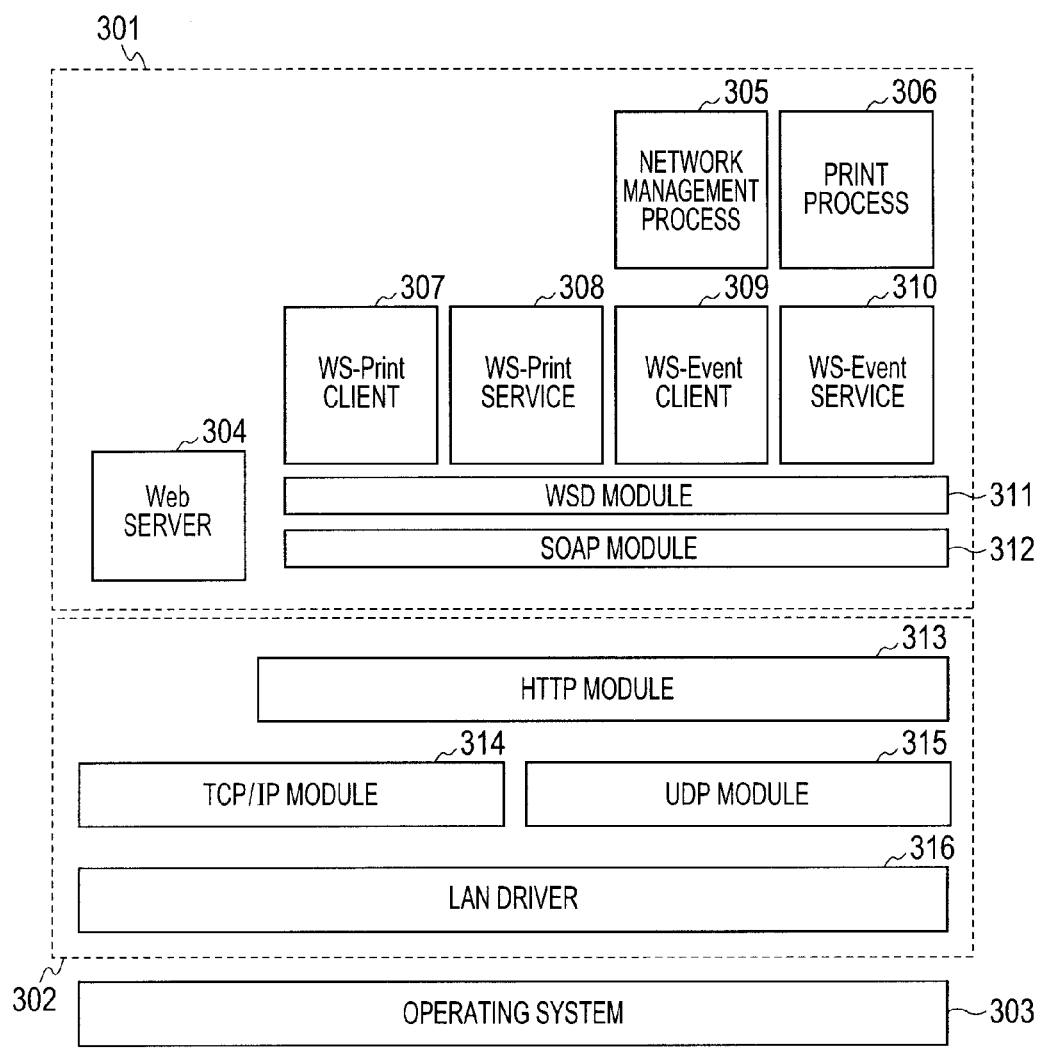
FIG. 3 illustrates a configuration of program modules relating to network printing.

FIG. 3 illustrates a configuration of modules related to network printing in programs stored in the ROM 206 of the network supporting printer in the first embodiment.

The programs are categorized into an application layer 301, a middleware layer 302, and an operation system 303. The operation system 303 is started first and then the middleware layer 302 is called. In accordance with the activation condition of the apparatus, necessary modules are activated in sequence. The middleware layer 302 intervenes between the operation system 303 and the modules of the application layer 301, and it is responsible for communication control. A LAN driver 316, a TCP/IP module 314, and a UDP module 315 in the middleware layer 302 control the network controller 205 and perform communication via TCP/IP and UDP. The middleware layer 302 includes an HTTP module 313 that performs processing relating to HTTP (Hyper Text Transfer Protocol). The HTTP is a protocol for sending and receiving data over TCP/IP.

The application layer 301 includes a Web server 304, a print process 306 for controlling modules related to WSD and a printer engine and executing printing, and a network management process 305 for performing processing related to network management when the printer serves as the representative printer. The modules related to WSD include a WSD module 311, a WS-Print client 307, a WS-Print service 308, a WS-Event client 309, and a WS-Event service 310.

Although not shown, an XML (Extensible Markup Language) analysis module is also included. In general, network setting including an IP address setting for printing/scanner can be made by activating a web browser on a client PC and accessing a printer via the network, in addition to from an operation unit 203.

The HTTP module 313 is used for management as a web server employed for settings, as well as for HTTP communication defined in the WSD. In the WSD, various services can be realized by exchanging commands and information written in XML using SOAP (Simple Object Access Protocol) via a SOAP module 312 over HTTP.

The XML analysis module is used in WSD communication for analyzing data received via SOAP-over-UDP communication or the like in the WSD, or SOAP data transmitted and received in HTTP. SOAP-over-UDP communication transfers XML to UDP in SOAP.

Figure 4:
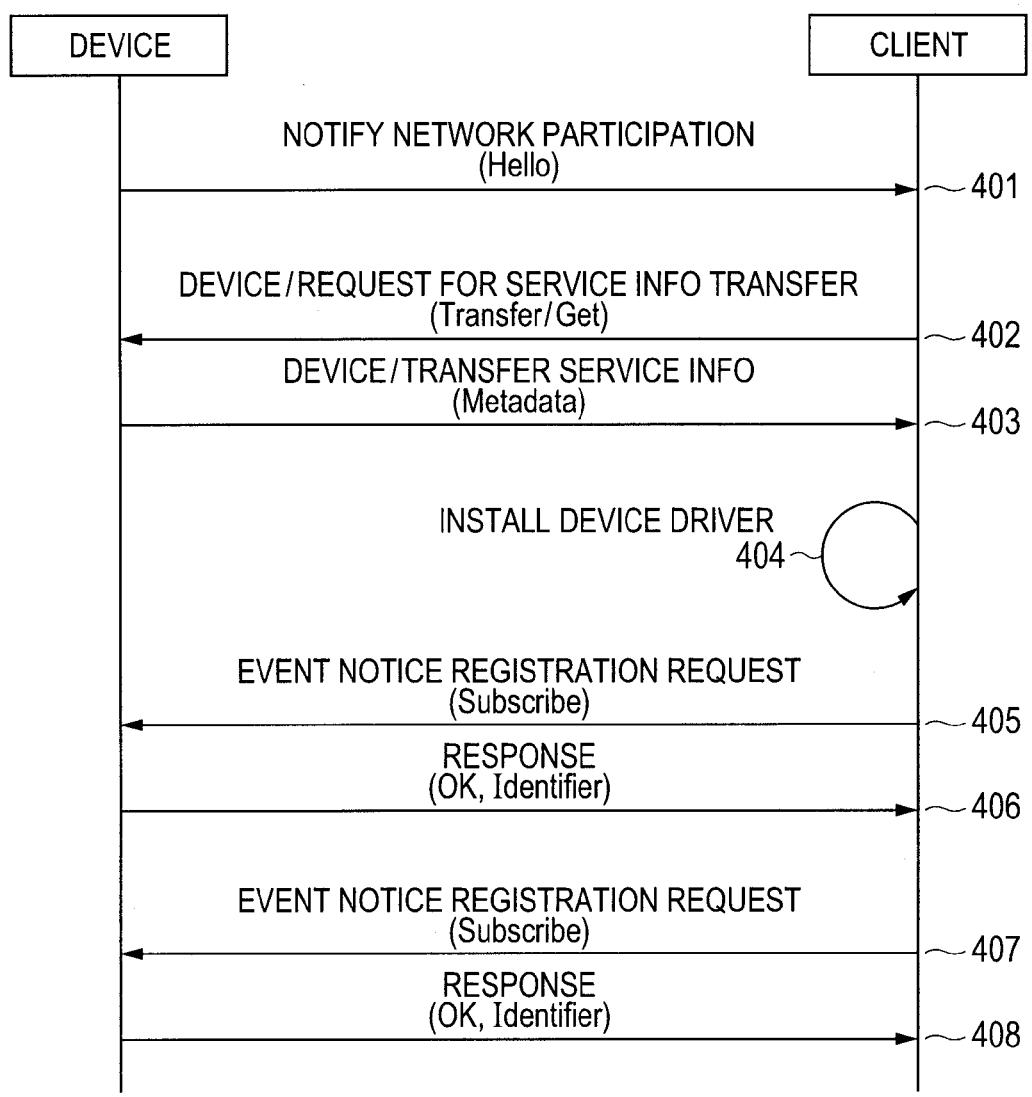
FIG. 4 illustrates a communication sequence between a client and a device.

FIG. 4 illustrates a communication sequence between a client and a device in the general WSD.

The sequence includes detection (Discovery), metadata transfer to the device (Description), device driver installation to the client (PnP-X), and registration of an event notice service (Subscription).

The client carries out a response to a Hello message sent from the device and issuance of a Probe message for device search, via the WSD module 311 and the SOAP module 312. FIG. 4 shows a case where the device is started up with the client already active. In communication 401, the device issues a Hello message. The Hello message is sent by multicasting. In communication 402, the client issues a TransferGet message upon receiving the Hello message to obtain metadata information of the device.

In communication 403, attribute information (metadata) of the device is transferred in a Metadata response to the TransferGet message. The metadata includes the device name, model name, service features of the device, a presentation URL for accessing the device, an identifier for uniquely specifying the device and/or a service on the network (UUID), and the like. In operation 404, the client searches for a driver that matches the attribute information of the device received in communication 403 only if the client has a PnP-X function, and installs the searched device driver. However, when the client is not a PC but represents client features of the device, the installation is not necessary.

The client makes an event notice registration request (Subscribe) in communication 405. Event notices that can be registered may be determined from the device attribute information acquired in communication 403. For example, if the device attributes include a printing service, a list of events relating to the printing service is defined in the WSD printing service. In communication 406, the device returns an OK as an event notice registration response as well as an identifier (Identifier) generated on the device at the time of registration. When an inquiry about a registered event notice or a request for deregistering an event (Unsubscribe) is received from the client at a later time, it will be checked against this identifier (Identifier).

For the printing service, a number of event issuance types relating to printing are defined. For example, a JobEndState event is a type of event that is issued by the printer upon completion of a printing job. In communication 407, an event notice registration request of a different type from that in communication 405 is transmitted, and in communication 408, an OK response is again returned because the device supports the event.

For the printing service, there is defined such specification stipulation that, when metadata information of a device called PrinterConfiguration is modified, the device should notify a registered client apparatus of PrinterElementChangeEvent as an event notice.

Thus, the present embodiment defines a data area for network management as an element of PrinterConfiguration in the representative printer and the non-representative printer.

In the printing service, by setting PrinterConfiguration in RequestedElement attribute of a GetPrinterElements request and issuing the request, information on a printer to which the request is issued can be acquired. Also for the printing service, an element can be extended in a GetPrinterElements request, according to original definition. By defining an original element in the printing service, a data area for network management is realized.

For example, extension of a NetworkManagementInfo element is defined as part of PrinterConfiguration metadata contained in a GetPrinterElements request response. For definition of extension, the name of an element may be any name as long as it is easy to understand. In the representative printer, management information acquired by specifying NetworkManagement is saved in a data area which is provided for saving printers' management information described below. In the non-representative printer, a data area is secured and no value is stored therein.

If the representative printer clears its own data area for network management when stopping operation, the value of PrinterConfiguration is considered as being changed and the representative printer sends a PrinterElementsChangeEvent according to a WSD stipulation. A non-representative printer which has received the PrinterElementsChangeEvent as a printer which inherits representative authority updates its management information so as to switch itself to the representative printer.

Figure 5:
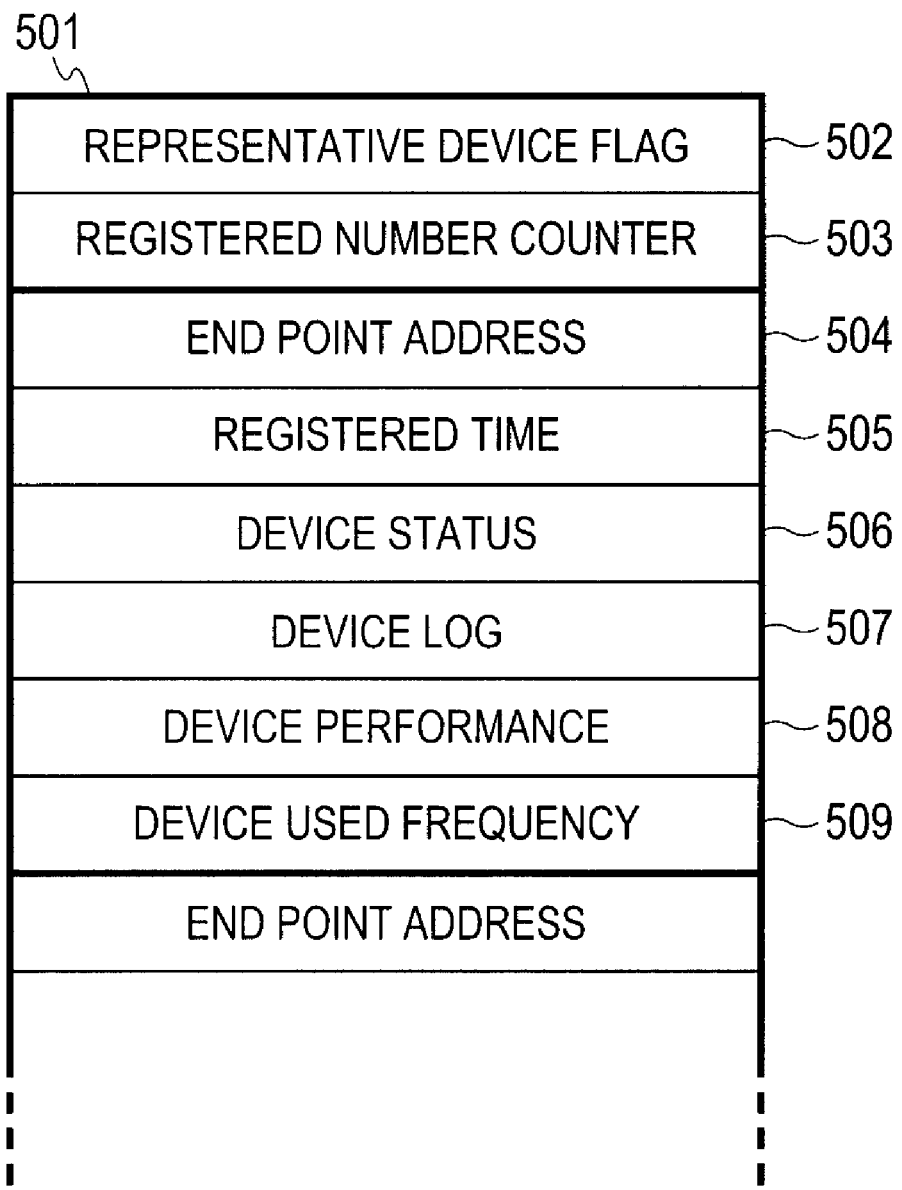
FIG. 5 illustrates a data area 501 for use upon a changeover to the representative printer.

FIG. 5 illustrates details of a data area 501 for saving management information for printers detected on the network when a non-representative printer becomes the representative printer.

As the data area 501, the same data area is defined without regard to whether the printer is the representative printer or a non-representative printer. A representative device flag 502 indicates whether the device is the representative printer (ON) or a non-representative printer (OFF). A procedure for setting the representative device flag will be shown later. A registered number counter 503 indicates the total number of printers that have been detected in the vicinity and added to the data area 501 as a list. A device management information list for one device includes an endpoint address 504, a registered time 505, a device status 506, a device log 507, a device performance 508, and a device used frequency 509.

The device status 506, the device log 507, the device performance 508, and the device used frequency 509 are data areas for network management, and management history for individual printers is written in the areas while the device is active as representative printer. Since the endpoint addresses differ from service to service, a number of addresses need to be prepared, and endpoint addresses corresponding to individual services are stored based on the device attribute acquired in communication 403 of FIG. 4

As various other types of data can be necessary for network management, data stored in the data area for management are not limited to the ones described above.

A list of printers for which those pieces of information have been detected is created and stored in the data area 501. Upon reception of a Bye from a WSD printer, the endpoint address of that printer is referenced and its device management information list is deleted. As the size of the area, an area of a necessary size can be added.

Figure 6:
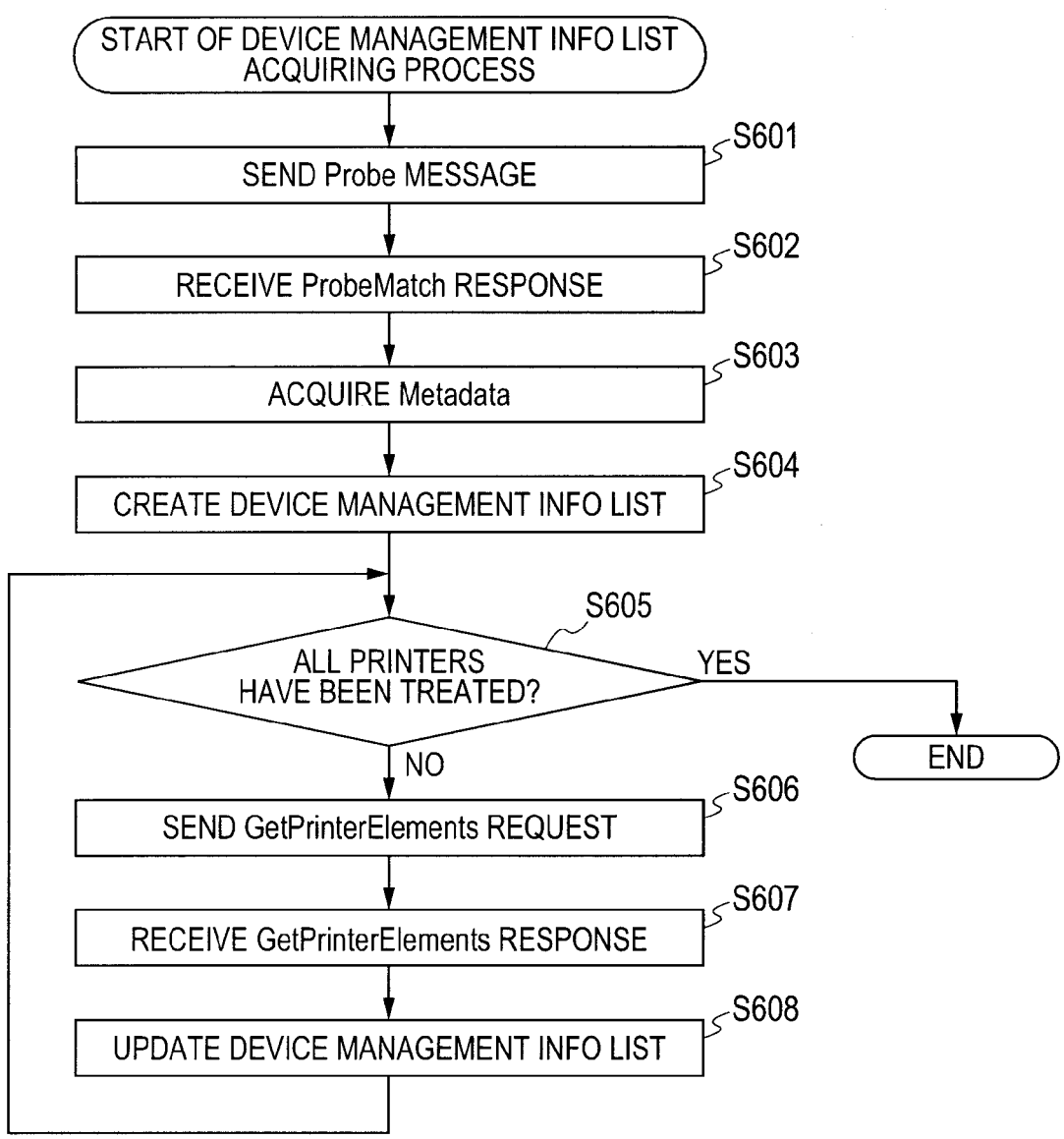
FIG. 6 illustrates a process for the representative printer to acquire a device management information list.

FIG. 6 illustrates a process for the representative printer to acquire device management information lists for non-representative printers that are present in its vicinity, using the WSD protocol. The following description assumes that PR1 is the representative printer.

The device management information list contains an address for referencing the device, a flag for determining a changeover between representative/non-representative, and a data area for management information.

At step S601, the representative printer PR1 sends a Probe message by multicasting. Multicast means transmission of packets (or data) to a number of predetermined network terminals (or printers) at a time. The multicast Probe message is transmitted for the purpose of searching for devices on the network that support the WSD printing service. Non-representative devices that have received the request and that support the WSD printing service send back a ProbeMatch response.

At step S602, the representative printer PR1 receives ProbeMatch responses from other printers supporting the WSD printing service. As ProbeMatch responses can be transmitted from multiple printers, a certain length of time is allowed for reception thereof.

By executing the processes at S 601 and S602 a number of times, undiscovered devices can be reduced.

At step S603, from a printer that has returned a ProbeMatch response, the representative printer PR1 acquires metadata describing details of a service possessed by the printer. An address representing an Endpoint from which the metadata can be acquired is written in the ProbeMatch response received at step S602. The metadata can be acquired by executing acquisition (Transfer and Get) to that address.

WS-Transfer is for transferring data according to the WSD protocol, and Get can retrieve data.

At step S604, the representative printer PR1 creates the data area 501 (or the device management information list) illustrated in FIG. 5 from the metadata acquired at step S603. The number of printers that were found is set in the registered number counter 503, and Endpoint addresses for accessing services contained in the metadata are set in the endpoint address 504. The list of FIG. 5 is added in a similar way for each printer found.

Processes at steps S601 to S603 are called WS-Discovery for finding WSD supporting devices.

At step S605, the representative printer PR1 determines whether all of the printers for which management information were retrieved and which are registered in the list have been treated, based on the device management information list created at step S604.

If all the printers have been treated, the process of retrieving device management information lists is terminated. If not all printers have been treated, the printer PR1 sends a GetPrinterElements request of the WSD printing service for acquiring management information for a printer that supports WSD printing at step S606. This request command is transmitted to the endpoint address 504 that is registered in the device management information list created from the metadata at step S604.

Based on the GetPrinterElements request, a type of information can be specified and acquired. The GetPrinterElements can specify and acquire a type of management information managed by the representative printer (e.g., printing history, error information, printer operation history and the like).

At step S607, the representative printer PR1 receives a GetPrinterElements response from a non-representative printer. The GetPrinterElements response contains management information.

At step S608, the representative printer PR1 saves the management information acquired at step S607 in the device status 506, device log 507, device performance 508, and device used frequency 509 shown in FIG. 5. The management information is added to the device management information list to complete the list.

Returning to step S605, the representative printer PR1 repeats a similar process on all non-representative printers found to update the device management information list.

Figure 7:
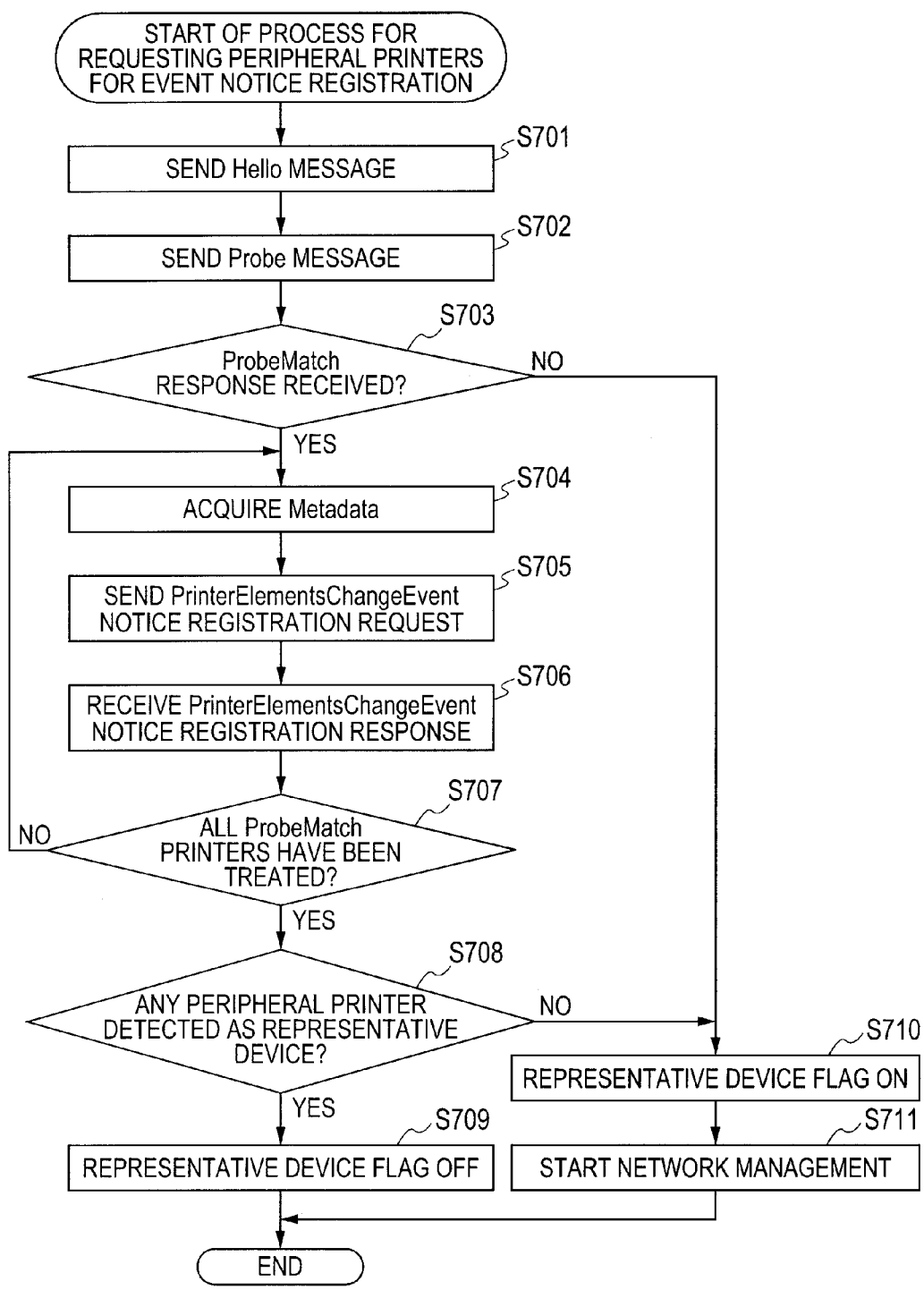
FIG. 7 illustrates a process for a printer to request peripheral printers to register for event notice.

FIG. 7 illustrates a process for the representative printer to request peripheral non-representative printers to register for event notice using the WSD protocol.

A printer carries out registration of event notice upon being powered up, and at the same time determines whether the printer will serve as the representative printer or a non-representative printer. However, whether to serve as the representative or non-representative printer may be determined at a time other than power-up, and the time of power-up is not limitation.

To determine the representative printer, a printer that is activated first becomes the representative printer. That is to say, in the example shown in FIG. 1, if the printers PR1, PR2 and PR3 are powered up or connected to the network in this order, the printer PR1 becomes the representative printer, and printers PR2 and PR3 are non-representative printer.

When the printer PR1 is started up first, the printer PR1 sends a Hello message by multicasting at step S701 according to the stipulation of WS-Discovery of the WSD protocol.

The printer PR1 then executes steps S702 to S711 for determining whether it should have the authority of representative/non-representative.

At step S702, the representative printer PR1 issues a Probe message. If there is any printer already activated in the vicinity, the representative printer PR1 receives a ProbeMatch response from a nearby printer at step S703 according to the stipulation of WS-Discovery. In this case, however, no response is received because only the printer PR1 is present. If no ProbeMatch response is returned after a predetermined waiting time period, the representative printer PR1 proceeds to step S710 to set the representative device flag 502 of FIG. 5 to "1" to establish itself as the representative printer.

If a ProbeMatch is received at step S703, the representative printer PR1 carries out metadata acquisition at step S704 to the Endpoint address contained in the ProbeMatch message.

At step S705, the representative printer PR1 transmits an event notice registration request message to the printer from which the ProbeMatch was received at step S703. Here, the representative printer PR1 sends the event notice registration request message regardless of whether the printer PR1 is the representative or a non-representative printer.

At step S706, the printer PR1 receives an event notice registration request message response, and stores the time of its reception in the registered time 505 of FIG. 5. The registered time may be either a relative time or an absolute time.

At step S707, it is determined whether a ProbeMatch response and an event notice registration request message have been sent to all the printers that returned a ProbeMatch response at step S703. When the response and message have been sent to all the printers, the flow proceeds to S708. If there is any printer to which transmission is not completed yet, the flow returns to step S704, where transmission is continued.

In metadata of each printer, a representative authority element indicating whether the printer is representative or non-representative is defined. Each printer creates a representative authority element in accordance with the value of the representative device flag 502, when creating metadata.

At step S708, the printer PR1 determines whether to set representative authority or not. If representative authority elements in metadata obtained from printers at steps S702 to S707 include a value indicative of "representative", the printer PR1 sets its own representative device flag 502 to OFF at step S709.

In contrast, if the representative authority elements in metadata obtained from all devices do not include a value indicating "representative", the printer PR1 sets its own representative device flag 502 to ON at step S710. If the printer PR1 becomes the representative printer at step S710, the printer PR1 starts network management at step S711. Network management by the representative printer includes acquisition of management information from non-representative printers illustrated in FIG. 6.

Figure 8:
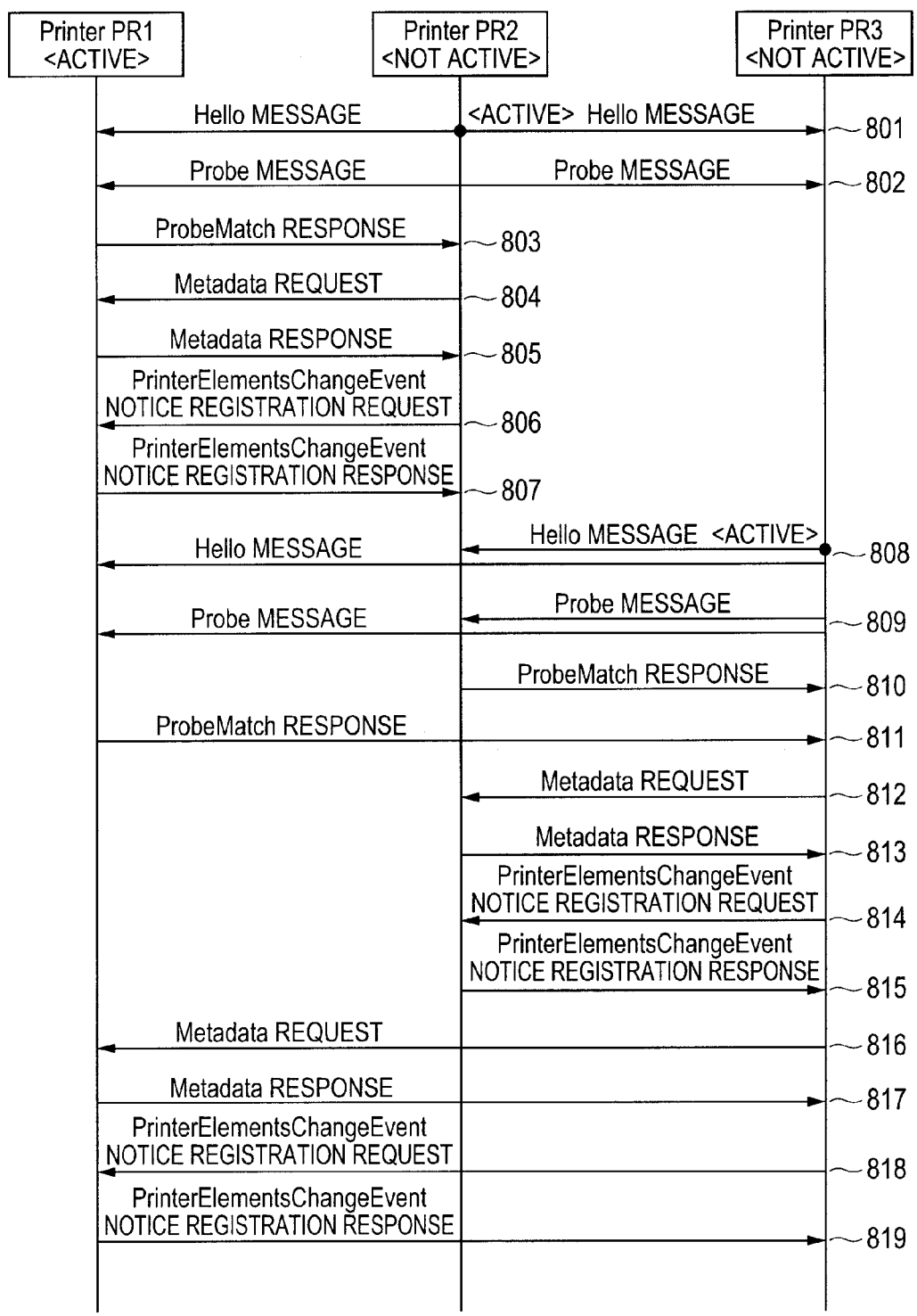
FIG. 8 illustrates a communication sequence after it is decided the printer PR1 serves as the representative printer.

FIG. 8 illustrates a communication sequence performed when there is a change in state of the network system as printers PR2 and PR3 are activated in sequence after it is decided that the printer PR1 serves as the representative printer.

The printer PR2 is activated with the printer PR1 already being active as the representative printer. In communication 801, the printer PR2 sends a Hello message by multicasting. In communication 802, the printer PR2 sends a Probe message by multicasting. The printer PR1 does not respond to the Hello message but responds to the Probe message, and sends a ProbeMatch response to the printer PR2 in communication 803 by unicasting. Upon receiving the ProbeMatch response, the printer PR2 requests metadata from the printer PR1 in communication 804. The printer PR1 returns metadata in which a representative authority element indicative of representative is set, to the printer PR2, in communication 805.

In communication 806, the printer PR2 issues an event notice registration request message, and receives an OK response and an identifier in communication 807. The printer PR2 makes sure that there is no ProbeMatch from other printers and configures itself as a non-representative printer.

The printer PR3 is activated with the printer PR1 already being active as the representative printer and the printer PR2 already active as a non-representative printer. In communication 808, the printer PR3 sends a Hello message by multicasting. In communication 809, the printer PR3 sends a Probe message by multicasting. The printer PR1 returns a ProbeMatch to the printer PR3 in communication 811, and the printer PR2 returns a ProbeMatch to the printer PR3 in communication 810. The printer PR3 which has received Probe-Matches from the printers PR1 and PR2, acquires metadata from and sends an event notice registration request message to the two printers, in communications 812 to 819.

The printer PR3 recognizes that the printer PR1 is the representative printer, by seeing the representative authority element embedded in metadata in communication 817. The printer PR3 accordingly sets itself as a non-representative printer at step S709 in FIG. 7.

Figure 9:
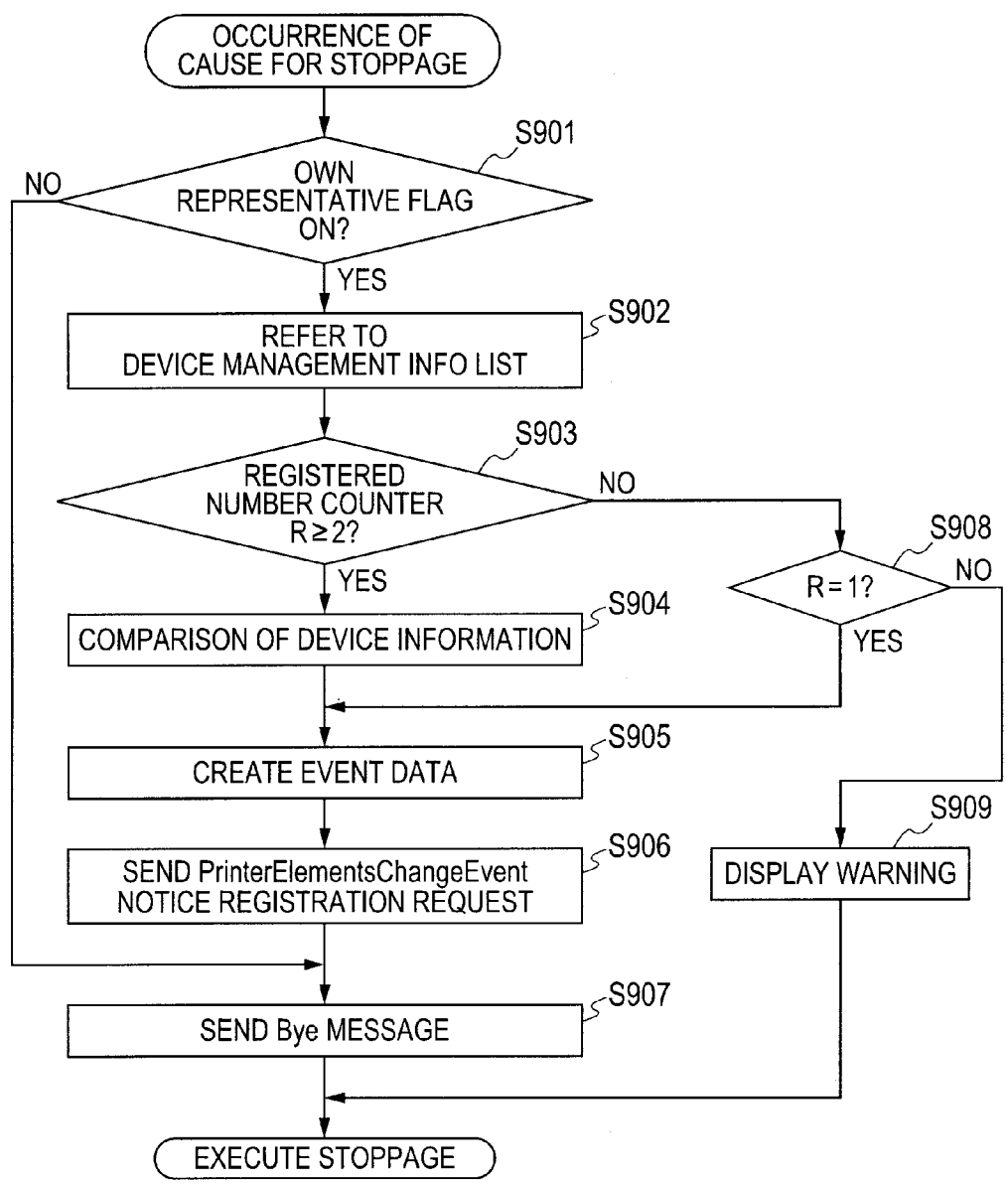
FIG. 9 illustrates a process for inheriting management authority as the representative and accumulated management information.

FIG. 9 is a flowchart illustrating a process of inheriting management authority as the representative printer and management information accumulated so far when there is a changeover between the representative printer and a non-representative printer prior to occurrence of an error, power-off or the like.

When a cause of stoppage occurs, a printer determines at step S901 whether its own representative device flag 502 is now set to ON. If the flag is set to OFF, the printer issues a Bye message and stops operation at step S907. If the flag is ON, the printer proceeds to step S902.

At step S902, the printer refers to the registered number counter 503 in the device management information list shown in FIG. 5. If the value of the counter is $\geq 2$ at step S903, the flow proceeds to step S904, where registered device management information lists are compared with each other. When there is only one printer, this comparison is not necessary, so the flow proceeds to step S908. While in this example the number of registered printers is equal to the number of registered requests for event notice registration, event notice registration requests may be separately managed.

At step S904, among printers for which event notice registration was requested, one that was registered at the oldest time is identified based on comparison with registered time 505. The representative printer then selects the identified printer as a device to which an event notice for being selected as the next representative printer will be sent immediately before stopping operation as a printer.

The criterion for selecting a printer that will be selected as the next representative printer at step S904 may be the device performance 508. Device performances of printers may be compared and one having the fastest computation speed or one that has the largest memory area may be selected as the next representative printer, for example. Alternatively, device used frequencies 509 of printers may be compared at step S904, and one that has been used least frequently may be selected as the next representative printer. Alternatively, a printer that has the best network communication performance so far, which is included in device log, may be selected as the next representative printer at step S904.

At step S905, SOAP data for event notice to the next representative printer is created. The WSD has a stipulation that PrinterElementsChangeEvent should be issued when part of PrinterConfiguration is changed as device configuration information. In the SOAP data for transmission in PrinterElementsChangeEvent, a NetworkManagementInfo element for management information is defined. And within the element, an element is generated using the representative authority element and information including the device status 506, device log 507, device performance 508 and so on for individual printers of FIG. 5.

At step S906, the SOAP data for the PrinterElementsChangeEvent created at step S905 is transferred to the endpoint address 504.

At step S907, after waiting for completion of the event notice, the printer issues a Bye message and detaches from the network.

If the value of the registered number counter 503 indicates zero at step S908, the flow proceeds to step S909. Step S909 represents a case where an inheriting printer cannot be found, in which case a message such as "Network management function is to be disabled. Acquired information may be lost. Would you like to disable?" is indicated on a display panel to prompt the user to decide whether to really disable the network management feature.

Figure 10:
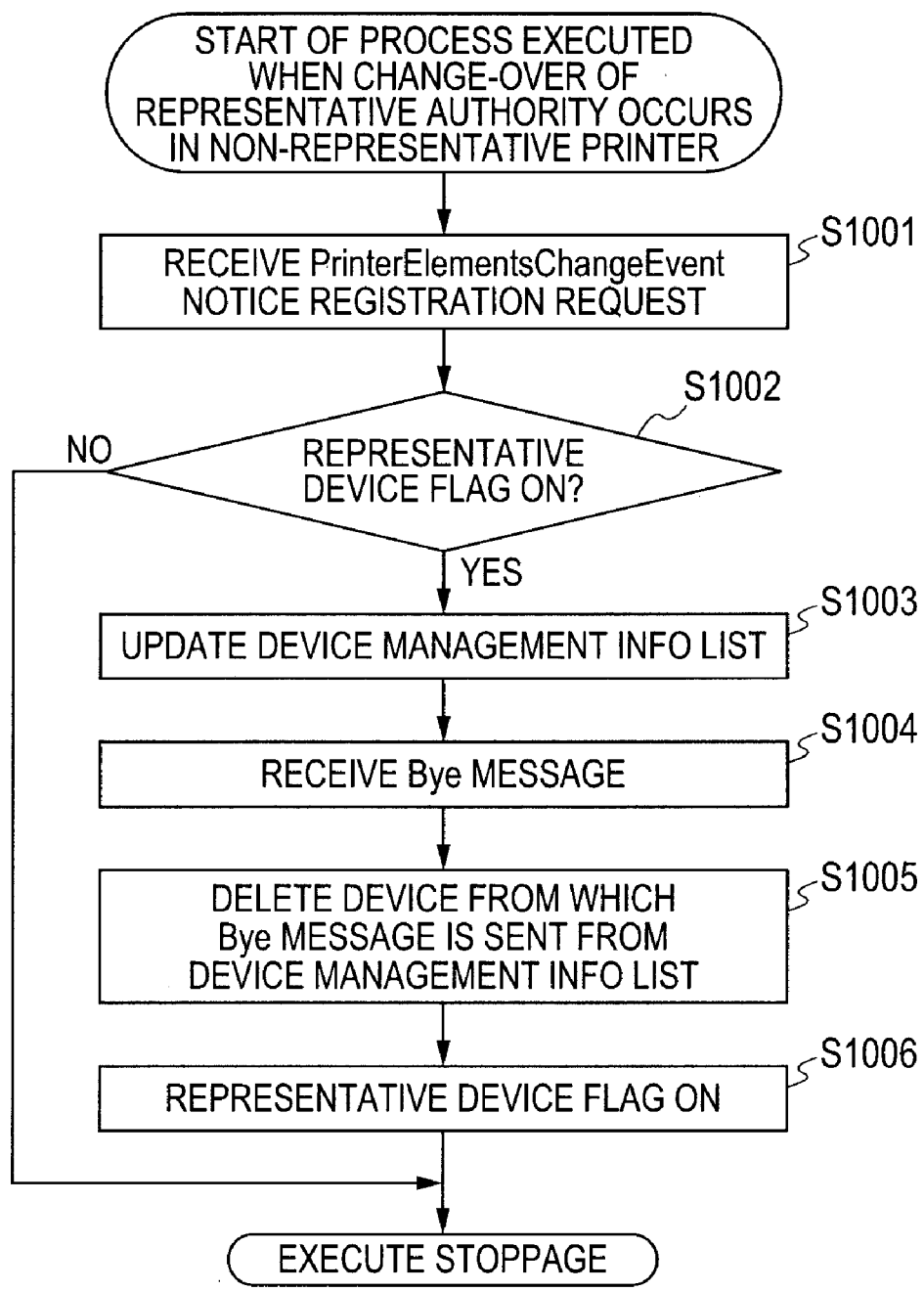
FIG. 10 illustrates processing by a non-representative printer upon a changeover of representative authority.

FIG. 10 is a flowchart illustrating a process performed when a changeover of representative authority occurs on a non-representative printer.

Upon receiving a PrinterElementsChangeEvent at step S1001, the non-representative printer reads the representative authority element in the event notice data at step S1002. If "representative" is set in the element (i.e., if the representative device flag is ON), the printer executes changeover to the representative printer authority from steps S1003 to S1006.

For a non-representative printer, a value of zero is set in areas relating to management information in the data area 501 shown in FIG. 5, namely device status 506, device log 507, device performance 508, and device used frequency 509. At step S1003, information on individual printers relating to the management information is inherited from the representative printer before stoppage of the representative printer, and the data areas are updated.

At step S1004, the printer receives a Bye message from the representative printer before stoppage. At step S1005, the printer deletes the representative printer before stoppage from its own device management information list.

At step S1006, the printer changes its setting as non-representative to representative printer, that is, sets the representative device flag 502 to ON to enable network management features.

Figure 11:
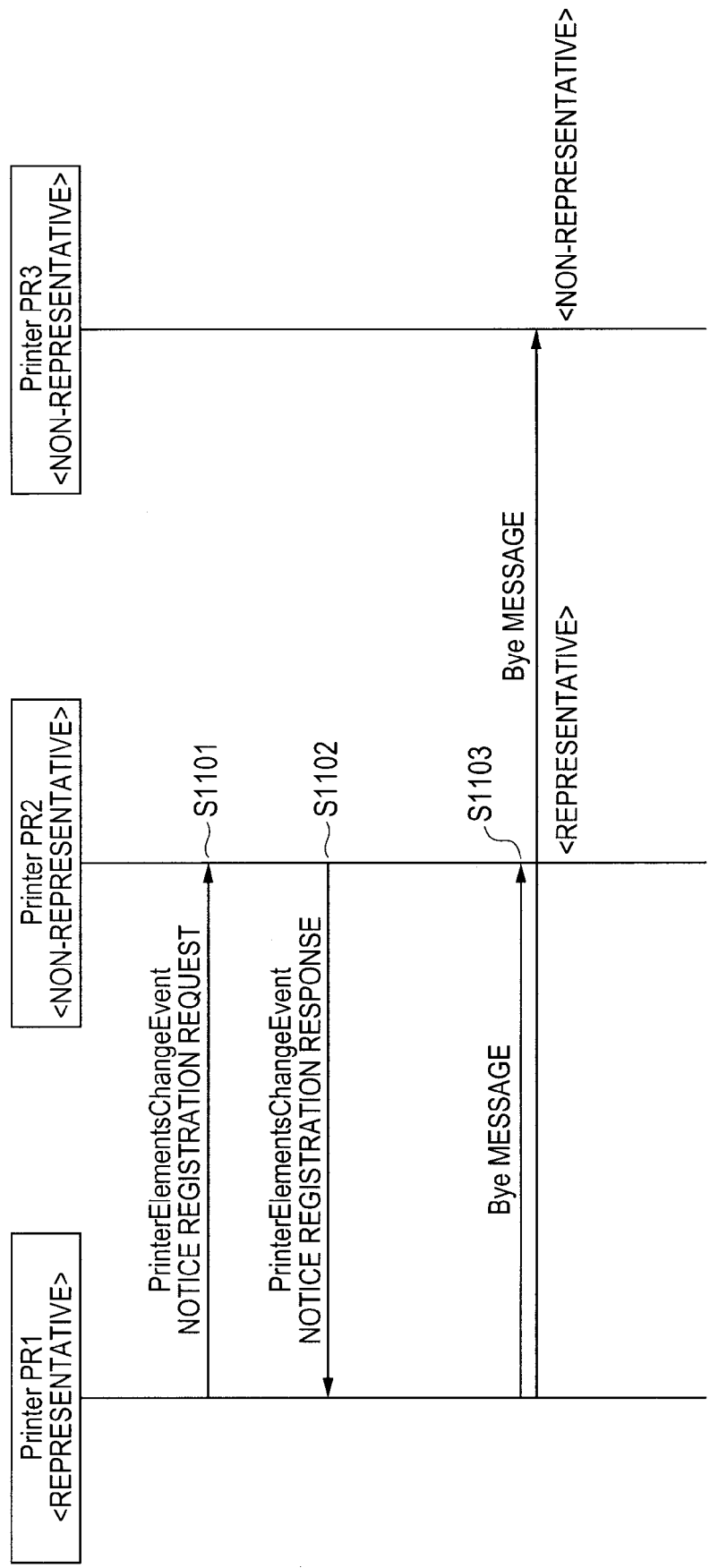
FIG. 11 is a sequence chart illustrating transmission of representative authority and management information to a non-representative printer.

FIG. 11 illustrates a communication sequence for sending representative authority and management information from the representative printer to a non-representative printer by an event notice.

At step S1101, before the printer PR1 as the representative printer stops operation, the printer PR1 sends a PrinterElementsChangeEvent to the printer PR2 according to the process of FIG. 9. At step S1102, the printer PR2 returns to the printer PR1 an OK response indicating that the event notice has been received. At step S1103, the printer PR1 sends a Bye message by multicasting, thereby detaching from the network as a printer.

Second Embodiment

In the first embodiment, registration of event notice relating to inheritance of the representative printer is carried out by individual printers upon being power up. On the other hand, a second embodiment realizes registration of event notice by the representative printer monitoring non-representative printers also at other times than power-up.

In the first embodiment, at a step where registration relating to inheritance of representative printer is made, each printer searches a surrounding network at the time of power-up and registers event notice with any other printers detected. And at an inheritance step, when a cause of stoppage has occurred, the representative printer automatically selects a printer to inherit the representative printer based on information registered so far for event notice from surrounding printers, and sends representative authority as the representative printer and accumulated management information to that printer.

In the second embodiment, at a step of registration relating to inheritance of the representative printer, the representative printer prompts non-representative printers to register for event notice at a time when a predetermined event has occurred on a non-representative printer. As the inheritance step is the same as that in the first embodiment, descriptions thereof are omitted.

The predetermined event may be a time immediately after there is a change in the state of a non-representative printer, a time immediately after settings of an apparatus are modified by the user, or a time immediately after printing is performed, for example. Such an event may result in a change in operation status and/or used frequency of a non-representative printer which serves as a criterion for selecting an inheriting printer after the representative printer stops operation.

In this method, a non-representative printer issues a multicast packet onto the network when such a predetermined event has occurred. The representative printer always monitors the network, and when detecting occurrence of an event, prompts a non-representative printer to register for event notice.

Figure 12:
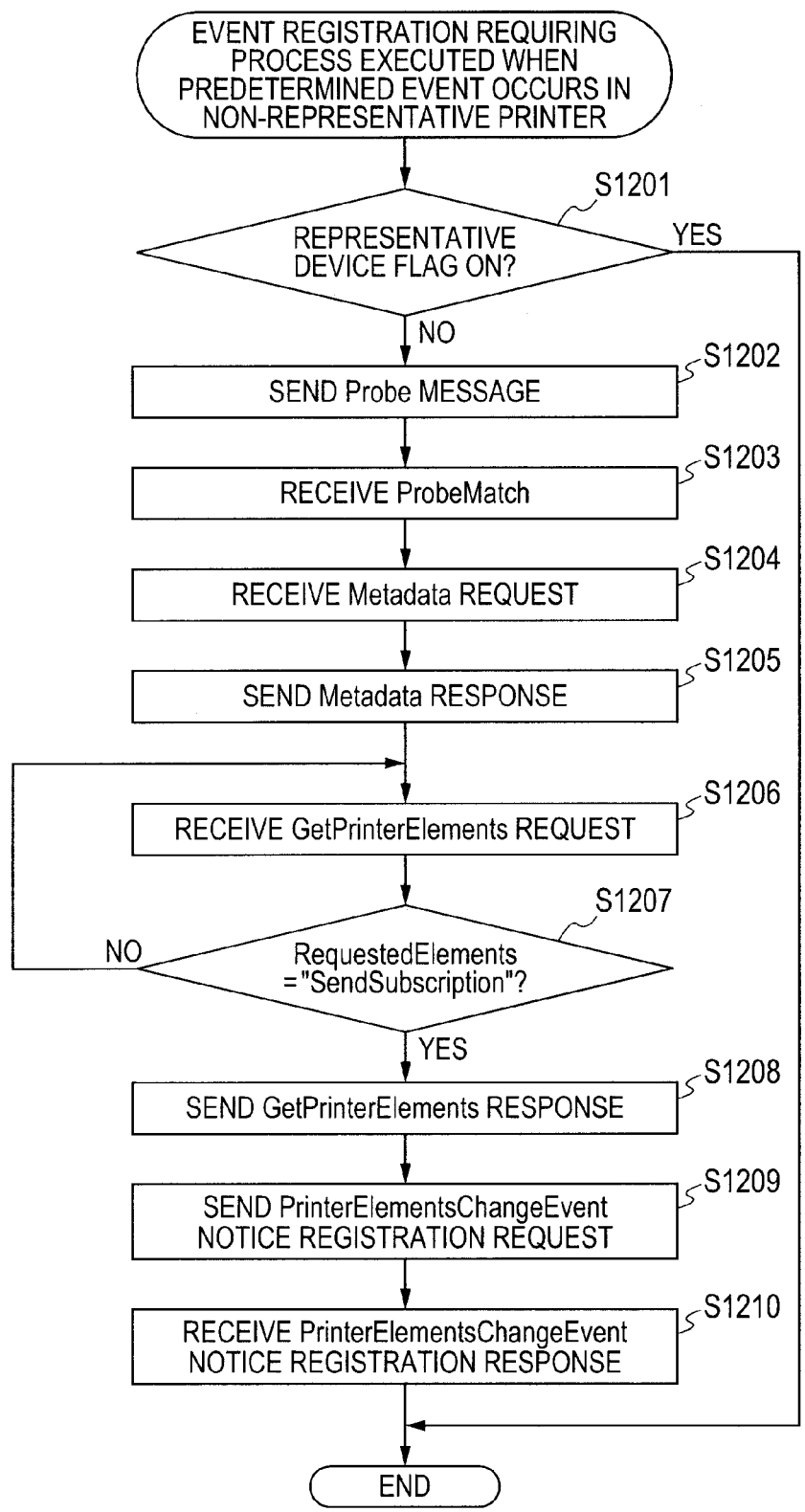
FIG. 12 is a flowchart illustrating a process of requesting registration of event notice from a non-representative printer.

FIG. 12 is a flowchart illustrating event registration requesting process performed when a predetermined event occurs on a non-representative printer.

First, when occurrence of a predetermined event is detected, it is determined at step S1201 whether the printer on which the event occurred is the representative printer or a non-representative printer by checking the representative device flag 502. If the printer is the representative printer, the process is terminated. If the printer is a non-representative printer, the flow proceeds to step S1202, where an event registration request process is executed.

At step S1202, to notify that a certain predetermined event has occurred, the non-representative printer issues a Probe packet to nearby printers by multicasting. Upon receiving the Probe packet, the representative printer returns a ProbeMatch response and then carries out metadata acquisition.

The non-representative printer receives the ProbeMatch response packet from the representative printer at step S1203. The representative printer retrieves the Endpoint address included in the ProbeMatch response and issues a metadata request at step S1204. Accordingly, the non-representative printer sends a metadata response at step S1205.

The representative printer analyzes metadata from the non-representative printer, and if the representative printer recognizes that the non-representative printer supports a printing service and an event notice registration service, the representative printer issues a GetPrinterElements request to the non-representative printer to prompt the non-representative printer to register for event notice. In the GetPrinterElements request, a RequestedElement attribute indicating the type of request is defined. The WSD protocol also has a mechanism for defining a Private schema for enabling extension of elements of GetPrinterElements request/response.

Accordingly, "SendSubscriotion" is described in RequestedElement attribute according to Private schema definition. The representative printer sets "SendSubscription" in RequestedElements of GetPrinterElements and sends it to the non-representative printer. Upon receiving the GetPrinterElements at step S1206, the non-representative printer determines whether "SendSubscription" is set in the RequestedElements or not at step S1207. If Yes, the flow proceeds to step S1208, where the non-representative printer sends a GetPrinterElements response.

The non-representative printer that has received the GetPrinterElements in which "SendSubsctiption" is specified recognizes that the printer is prompted to register for event notice by the representative printer. Therefore, the non-representative printer sends a PrinterElementsChangeEvent request to the representative printer at step S1209. The non-representative printer receives a PrinterElementsChangeEvent request response from the representative printer at step S1210, and the event notice registration request process ends.

Figure 13:
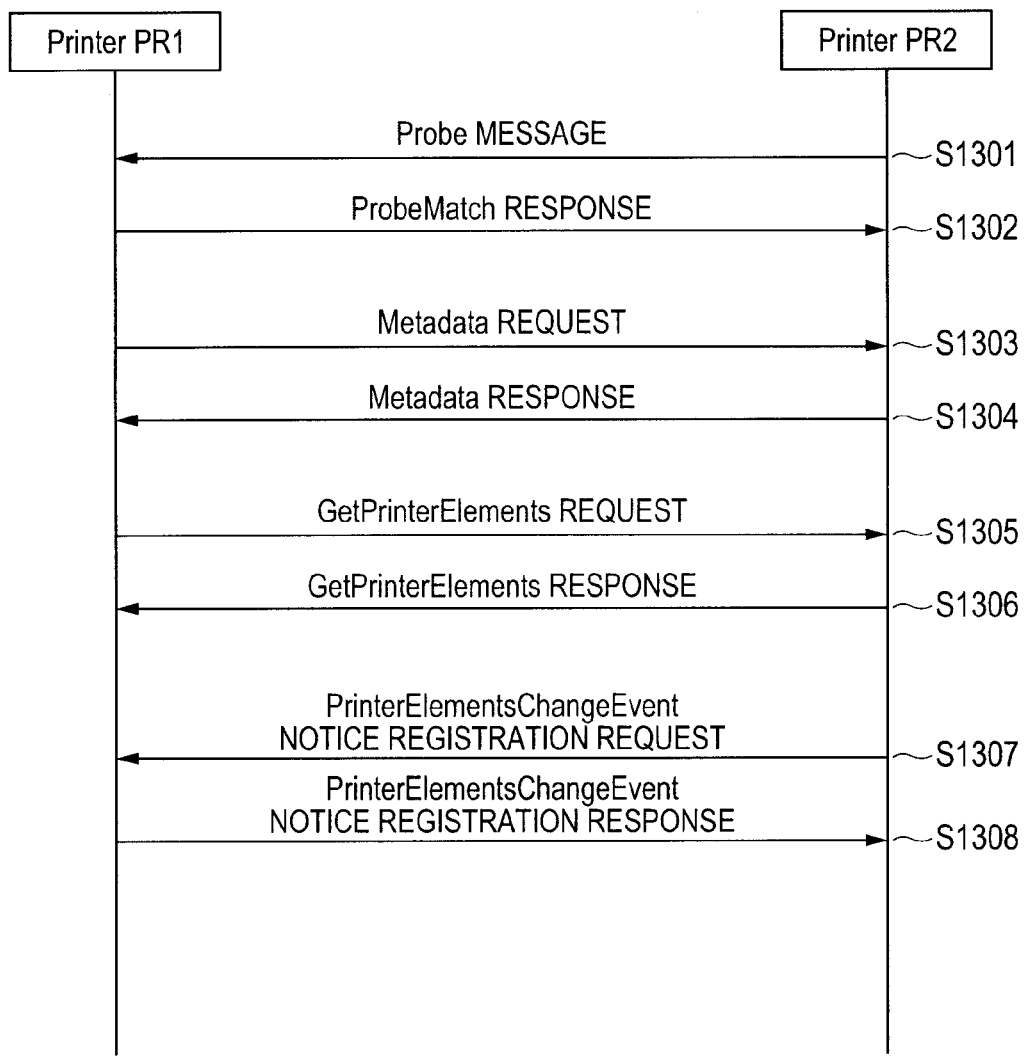
FIG. 13 is a communication sequence chart for a non-representative printer upon occurrence of a predetermined event.

FIG. 13 shows a communication sequence for when a predetermined event occurs on the printer PR2, which is a non-representative printer, when it is already decided that the printer PR1 is the representative printer.

The predetermined event may be a time immediately after there is a change in the state of an apparatus, a time immediately after settings of an apparatus are modified by the user, or a time immediately after printing is performed, for example.

In communication 1301, the non-representative printer PR2 issues a Probe because a predetermined event has occurred on the non-representative printer PR2. Upon receiving the Probe, the representative printer PR1 issues a ProbeMatch response in communication 1302. In communication 1303 and 1304, the representative printer PR1 obtains metadata from the non-representative printer PR2.

In communication 1305, the representative printer PR1 issues a GetPrinterElements request to the non-representative printer PR2 which issued the Probe, to thereby prompt printer PR2 to register for event notice. Here, the prompted non-representative printer makes an event registration request, whereby an inheriting printer can be selected from non-representative printers that are actually registered when a cause of stoppage has occurred on the representative printer and PrinterElementsChangeEvent can be issued.

"SendSubscription" is set in the RequestedElements attribute of the GetPrinterElements request issued by the representative printer to a non-representative printer. This attribute distinguishes the GetPrinterElements request from a GetPrinterElements request in which other RequestedElements attribute is specified.

In communication 1306, the non-representative printer PR2 issues a GetPrinterElements request response. In communication 1307, the non-representative printer PR2 issues a notice registration request for PrinterElementsChangeEvent to the representative printer PR1. Then in communication 1308, the non-representative printer PR2 receives a notice registration response for the PrinterElementsChangeEvent.

Through the above-described process, the representative printer can prompt a non-representative printer to register for event notice at a time when a predetermined event has occurred on the non-representative printer.

According to the above-described embodiments, it is not necessary to provide a special management apparatus because a changeover between the representative device and a non-representative device automatically takes place according to situation.

Additionally, according to the embodiments, management information that was accumulated in past can be automatically inherited in the event of a changeover between the representative device and a non-representative device, which is caused by power-off of the representative device, an error resulting from a cause associated with its main body, or the like. This method is therefore efficient as the new representative device does not have to collect management information for non-representative devices in its vicinity from scratch.

Furthermore, since a non-representative device is allowed to actively notify the representative device of a change in its own state, necessary information can be acquired with less network traffic when compared to conventional art in which the representative device periodically polls non-representative devices to acquire information.

Moreover, information that cannot be re-collected once lost, such as management information accumulated in a storage area of the representative device, including individual users' printing history, performance log for network communication, and/or apparatus operational status, can be inherited from the representative device to a non-representative device that should be the next representative.

The network printing system 100 is an example of a system in which when a non-representative device that can change over to the representative device becomes the representative device, the device manages information obtained from non-representative devices present in its vicinity as device management information.

The CPU 201 is an example of a command transmitting unit that transmits a command for requesting information required by the representative device from non-representative devices, and also an example of a command receiving unit for receiving an event notice registration request from peripheral apparatuses. The CPU 201 is an example of a representative device selecting unit for comparing pieces of device management information obtained from non-representative devices and selecting the next representative device, utilizing the WSD protocol, when the current representative device is to stop operation. The CPU 201 is an example of an inheritance information generating unit for inheriting representative authority and device management information by having the representative device notify a selected non-representative device of a representative device registered event.

The representative printer is an example of a management unit for managing information received by the command receiving unit as device management information, and also an example of a representative device selecting unit for determining the next representative printer from among non-representative printers based on device information. Here, by sending delegation of the authority and the device management information to the next representative printer before the printer functions of the representative printer are disabled or before disconnection from the network, the representative printer's authority and device information for non-representative printers are inherited.

The representative device selecting unit is a unit that identifies one of: a non-representative printer from which an event was received at the oldest time, one that has the least used frequency in device information, and one that has the highest performance in device information, as the next representative printer. A non-representative printer is a printer that, upon receiving device management information, rewrites itself to representative printer, overwrites the management information, and notifies multiple other printers on the network that the printer is now the representative printer through the command transmitting unit thereof.

Further, a non-representative printer is a printer that notifies multiple other printers on the network of a change in its state, using the command transmitting unit, when a change has occurred in its state. The predetermined timing is the time of power-on. The predetermined timing is after a non-representative device performs printing to cause a change in its apparatus state or after settings of an apparatus are changed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-112978, filed May 7, 2009, and Japanese Patent Application No. 2010-098686, filed Apr. 22, 2010 which are hereby incorporated by reference herein in their entirety.

What is claimed is:

1. A network system using a WSD protocol, comprising a plurality of devices capable of changeover between a representative device and a non-representative device, wherein the representative device comprises:

a command transmitting unit that transmits a command for requesting information required by the representative device for network management from the non-representative device, when the non-representative device has joined a network or when there is a change in a state of the non-representative device;

a command receiving unit that receives a command including the information sent from the non-representative device that has received the command;

a management unit that manages the information received by the command receiving unit as device management information;

a representative device selecting unit that selects a next representative device using the device management information when representative device functions of the representative device are to be disabled;

an inheritance information generating unit that generates inheritance information for delegating authority as the representative device and inheriting the device management information; and an authority inheriting command transmitting unit that sends the inheritance information to the next representative device, wherein the representative device selecting unit selects one of: a non-representative device from which the command receiving unit received the command at the oldest time in the device management information, a non-representative device that has the least used frequency in the device management information, and a non-representative device that has the highest performance in the device management information, as the next representative device, and wherein upon receiving the authority inheriting command, the non-representative device rewrites itself to the representative device, and notifies other devices on the network that it has become the representative device, using the command transmitting unit.

2. A management method for a network system using a WSD protocol, comprising a plurality of devices capable of changeover between a representative device and a non-representative device, the method comprising:

transmitting a command for requesting transmission of information required by the representative device for network management from the non-representative device, when the non-representative device has joined a network or when there is a change in a state of the non-representative device;

receiving a command including the information sent from the non-representative device that has received the command;

managing the received information as device management information;

selecting one of: a non-representative device from which a command including the device management information was received at the oldest time in the device management information, a non-representative device that has the least used frequency in the device management information, and a non-representative device that has the highest performance in the device management information, as the next representative device, when representative device functions of the representative device are to be disabled, and generating inheritance information for delegating authority as the representative device and inheriting the device management information; and sending the inheritance information to the next representative device, and wherein upon receiving the authority inheriting command, the non-representative device rewrites itself to the representative device, and notifies other devices on the network that it has become the representative device, using the command transmitting unit.

* * * * *